Dec. 7, 1926.                                               1,609,568
F. E. MOSS
POWER TRANSMITTING MECHANISM
Filed April 29, 1926        2 Sheets-Sheet 1
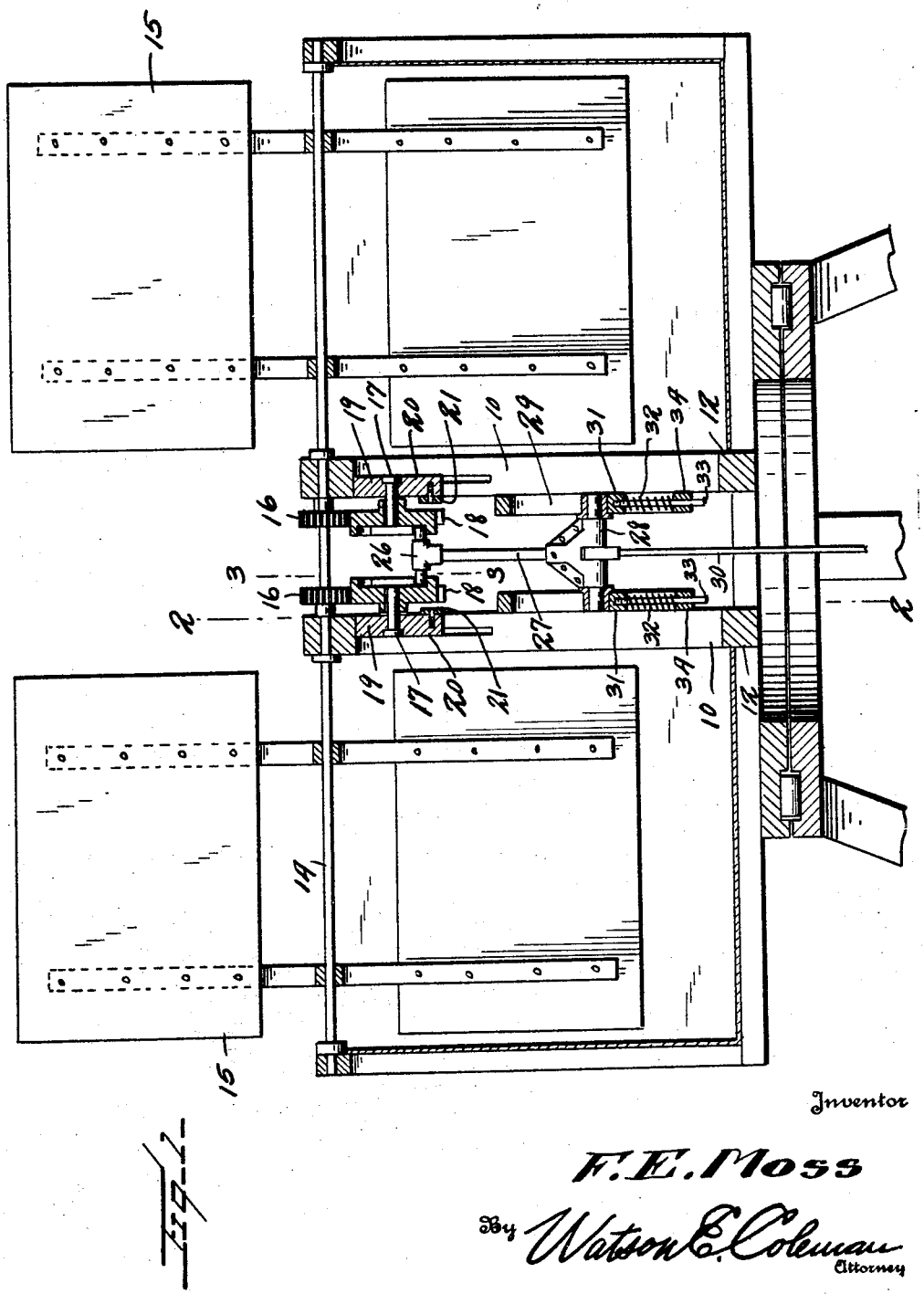
Inventor
F. E. Moss
By Watson E. Coleman
Attorney

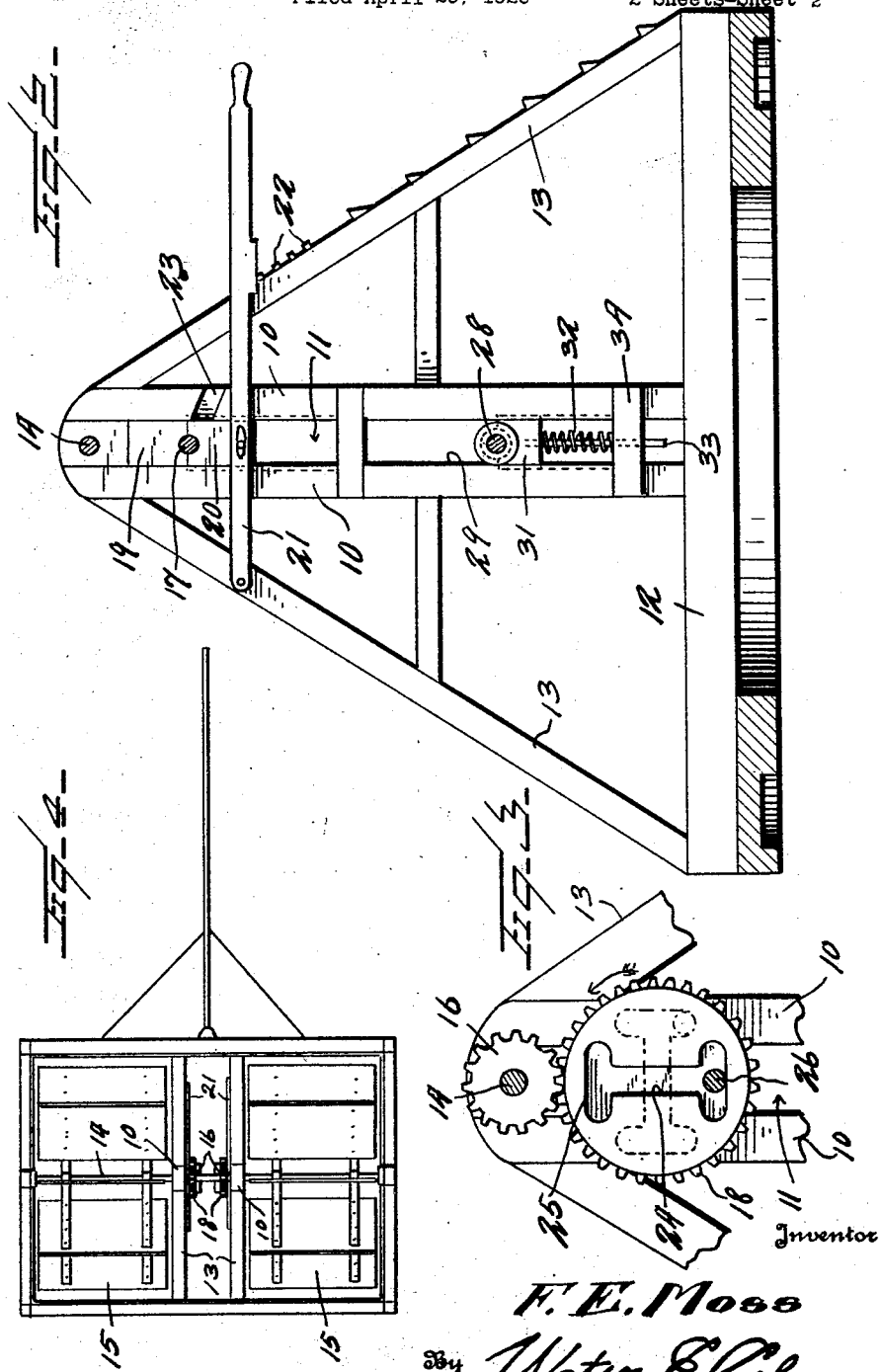

Patented Dec. 7, 1926.

1,609,568

UNITED STATES PATENT OFFICE.

FREDERICK EDWARD MOSS, OF ROGERS, ARKANSAS.

POWER-TRANSMITTING MECHANISM.

Application filed April 29, 1926. Serial No. 105,589.

This invention relates to devices for transmitting motion from a power shaft to a reciprocatory element and the general object of the invention is to provide a mechanism of this character particularly adapted for use in pumping mechanisms whereby one rotation of the power shaft will secure two full strokes for the reciprocatory member and, in this connection, to so construct this mechanism that the element will be lifted by power, then allowed to drop rapidly on the down stroke, and then be again lifted through the instrumentality of the power shaft.

A further object is to provide a mechanism of this character which is particularly adapted for use in windmills and pump operating windmills.

Another object is to provide means whereby the means for causing the reciprocation of said element may be very readily disconnected from engagement with the power shaft.

Other objects have to do with the details of construction and arrangement of parts as will appear more fully hereinafter.

My invention is illustrated in the accompanying drawings wherein:—

Figure 1 is a vertical transverse section of my power transmitting mechanism as applied to a windmill;

Fig. 2 is a section on the line 2—2 of Figure 1;

Fig. 3 is an enlarged fragmentary section on the line 3—3 of Figure 1;

Fig. 4 is a top plan view of the construction illustrated in Figure 1.

Referring to these drawings it will be seen that 10 designates two pairs of spaced uprights, the uprights of each pair being spaced from each other to provide a guideway 11. These uprights are mounted upon the base frame 12, which may form the upper end of a windmill tower and be mounted for rotation thereon in a horizontal plane, constituting a rotatable head for the windmill tower. The uprights 10 are held in their proper positions by the upwardly converging braces 13. I do not wish to be limited to the particular construction of the frame.

Mounted in suitable bearings carried by the upper ends of the uprights 10 is a power shaft 14 which is illustrated as carrying upon it the two wind wheels 15, which may be of any suitable or ordinary character. I have illustrated the shaft 14 as being horizontal as the wheels are rotating in vertical planes but I do not wish to be limited to this. Neither do I wish to be limited to the particular character of wind wheels which I have illustrated as the ordinary windmill wheel with radiating vanes might be used.

Mounted upon the shaft 14 between the uprights 10 are the pinions or gear wheels 16 and mounted upon shafts 17 which extend inward, each from one of the uprights 10, are the gear wheels 18, the teeth of which, under normal circumstances, mesh with the teeth of the pinions 16. The shafts 17 are mounted in upper and lower bearings 19 and 20 respectively. The upper bearing 19 may be fixed from vertical movement, while the lower bearing 20 may be mounted between the uprights 10 for vertical movement.

Pivotally mounted upon the framwork and specifically upon one of the diagonal braces 13, are levers 21 which support the lower bearing 20 and these levers are supported in a raised position or any desired lowered position by operatively engaging the teeth 22 formed in the opposite members 13. Thus, the levers may be lowered and this will lower the gear wheels 18 so as to carry them out of mesh with the pinions 16. Furthermore, one of the uprights 10 of each pair may be slotted, as at 23, so that when the bearings 20 are lowered by means of the levers 21, the corresponding shaft 17 may slip out of the bearing.

Each of the gear wheels 18 is formed with a diametrically extending slot 24. The slot at its upper and lower ends terminates in tranversely enlarged portions 25. Extending transversely across the space between the gear wheels 18 is a cross head 26, the outer ends of which engage in the slots 24 and slide therein. Pivotally connected to the middle of this cross head 26 is a link 27, the lower end of which is connected to a cross head 28 operating in vertical guides 29, and pivotally connected to this cross head 29 is a rod 30, which in turn may be connected to the piston of a pump or may be connected to any other suitable apparatus as, for instance, the drill rod of a well drilling machine or may be connected to transmit power to a distance.

Disposed below the ends of the cross head 28 are the buffers 31 which rest upon coiled compression springs 32, each buffer carrying a guide pin 33 passing through a spring and through a block 34.

In the operation of this mechanism, as the shaft 14 rotates under the action of the wind, the pinions 16 will transmit motion to the gear wheels 18 and as these gear wheels revolve, the cross head will be engaged by the portions 25 of the slots 24 and will be lifted. When the cross head 26 has been lifted to its highest point it will slip laterally out of the ends of the portions 25 and will drop through the length of the slots 24, its descent being cushioned by the springs 32 and buffers 31. It is to be noted that the enlarged portions 25 are laterally offset at their opposite ends with respect to the slots 24 so that the extremities of the cross head 26 slip into the ends of these enlarged portions 25 of the slots 24 and are thus lifted up and cannot fall downward through the slots 24 until they have been lifted up to their full extent. Then a continued movement of the gear wheels 18 causes the cross head 26 to slip out of these laterally offset portions 25 into the main slots 24 and, of course, then the cross head descends.

It is to be understood that when this mechanism is applied to a wind wheel suitable means will be provided for preventing the wind from striking the lower portion of the wind wheel so that the wind will only strike the upper portion of the wind wheel and rotate it in one direction. It is also to be understood that the head supporting the pump rod, the wind wheels, and the mechanism for causing the reciprocation of the pump rod will be mounted for rotational movement under the influence of a vane as is usual in windmills or other means may be used for shifting the head of the windmill or the whole body of the windmill so as to cause the wheels to be brought into proper position to receive the wind.

While I have illustrated the power shaft as being driven by wind wheels, it is to be understood that any other means might be used for this purpose and that the mechanism which I have described and illustrated might be used for other purposes than to operate a pump. Obviously, the gear wheels or cam wheels 18 may be made of any desired size and I do not wish to be limited to the particular form of the slots 24 and 25 as other forms of slots or openings might be provided which would secure a rapid descent of the cross head 26 and the relatively slow elevation of the cross head. The shock of the descending cross head 28 will be cushioned by the springs 32 and by adjusting the pins or bolts 33 the position of the buffers 31 may be adjusted and thus the distance through which the cross head 28 will fall may be adjusted.

I do not wish to be limited to the use of two separate axles passing through the cam wheels as one axle might pass through both cam wheels. Neither do I wish to be limited to any particular manner of fastening the wheels 16 to the shaft 14 nor to the particular manner of gearing the shaft 14 to the cam wheels as this may be varied in many ways. Furthermore, while I have illustrated the shaft 14 as horizontal, it is obvious that it might be vertical as well. Furthermore, I do not wish to be limited to the use of flat vanes or blades 15 as these might be cup-shaped and be mounted, of course, on hinges so as to take more or less of the wind to thus reduce or increase the speed and while I have illustrated the cam wheels so formed as to secure two drops for each complete rotation of the cam wheels, I do not wish to be limited to this as the recess in the cam wheel might be so formed as to secure as many reciprocations of the rod 30 as desired for each complete rotation of the cam wheel 18.

I claim:—

1. A power transmitting mechanism including a wheel having a slot therein extending diametrically across the wheel, the slot at its ends having laterally extending portions, a cross head having a portion engaged in said slot and adapted to slide into said laterally extended portions of the slot, and a member designed to be reciprocated and connected to said cross head, the rotation of said wheel acting to alternately lift the cross head and cause it to drop downward the length of said slot.

2. In a mechanism of the character described, a power shaft having pinions thereon, a pair of gear wheels engaging said pinions, each of these gear wheels being provided with a diametrically extending slot, a cross head having its ends operating in the slots of the gear wheels, and a member designed to be reciprocated and connected to said cross head, the rotation of said gear wheels acting to alternately lift the cross head and cause it to drop downward the length of said slot.

3. In a mechanism of the character described, a power shaft having pinions thereon, a pair of gear wheels engaging said pinions, each of these gear wheels being provided with a diametrically extending slot, a cross head having its ends operating in the slots of the gear wheels, and a member designed to be reciprocated and connected to said cross head, the rotation of said gear wheels acting to alternately lift the cross head and cause it to drop downward the length of said slot, a second cross head connected to and operating with the first named cross head, guides within which the ends of the second named cross head operate, and cushioning devices against which the extremities of the second named cross head strike as the cross head falls.

4. In a mechanism of the character described, a power shaft, gear wheels operatively engaged by the power shaft and rotated thereby, each of said gear wheels having a diametrically extending slot, the slot at its ends having laterally extending portions, a cross head having its ends engaged in said slots and adapted to slide into said laterally extended portions, a second cross head operating in guides, and a link connecting the two cross heads.

5. In a mechanism of the character described, a power shaft having pinions thereon, a pair of gear wheels engaged by said pinions and each having a diametrically extending slot, the ends of the slot being laterally extended, a cross head having its ends operating in said slots and the extensions thereof, vertical guides, a second cross head having its ends extending into said guides, a link connecting said cross heads, a pumping rod swingingly connected to the second named cross head, and spring cushions disposed in said guides with which the ends of the second named cross head are adapted to engage.

6. In a mechanism of the character described, vertical supporting members, a power shaft carried thereby and having pinions thereon, bearings mounted in said vertical supporting members, a pair of shafts mounted in said bearings, a gear wheel carried on each shaft engaging the corresponding pinion, each gear wheel having a diametrically extending slot, the slot being laterally extended at its ends, a cross head having its ends disposed in said slots of the gear wheels, and means for raising or lowering the bearings for said gear wheels to carry the gear wheels into or out of engagement with said pinions.

7. In a mechanism of the character described, vertical supporting members, a power shaft carried thereby and having pinions thereon, bearings mounted in said vertical supporting members, a pair of shafts mounted in said bearings, a gear wheel carried on each shaft engaging the corresponding pinion, each gear wheel having a diametrically extending slot, the slot being laterally extended at its ends, a cross head having its ends disposed in said slots of the gear wheels, and means for raising or lowering the bearings for said gear wheels to carry the gear wheels into or out of engagement with said pinions, said means including levers engaging the bearings, each lever being pivoted at one end and having means whereby it may be held in a raised position or permit it to be lowered.

In testimony whereof I hereunto affix my signature.

FREDERICK E. MOSS.